United States Patent
Aihara et al.

(10) Patent No.: US 8,023,377 B2
(45) Date of Patent: Sep. 20, 2011

(54) OPTICAL DISC DEVICE AND TRACKING AND SLIDER CONTROL METHOD

(75) Inventors: Ryuta Aihara, Tokyo (JP); Motoyuki Suzuki, Tokyo (JP); Akihiro Ashida, Tokyo (JP); Hisanobu Tajima, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 461 days.

(21) Appl. No.: 12/156,318

(22) Filed: May 30, 2008

(65) Prior Publication Data
US 2008/0304376 A1 Dec. 11, 2008

(30) Foreign Application Priority Data
May 31, 2007 (JP) .................................. 2007-145512

(51) Int. Cl.
G11B 5/58 (2006.01)
(52) U.S. Cl. ................. 369/53.14; 369/53.28; 369/44.28
(58) Field of Classification Search ............... 369/53.14
See application file for complete search history.

(56) References Cited

U.S. PATENT DOCUMENTS
6,711,109 B1 * 3/2004 Fukuda ...................... 369/53.14
2004/0213108 A1 * 10/2004 Fujiune ...................... 369/53.14
2006/0044962 A1 * 3/2006 Ishibashi et al. ............ 369/44.28
2006/0044963 A1 * 3/2006 Takahashi ................... 369/44.28

FOREIGN PATENT DOCUMENTS
JP 2005-216441 8/2005
* cited by examiner

Primary Examiner — Lixi C Simpson
(74) Attorney, Agent, or Firm — Kilpatrick Townsend & Stockton LLP

(57) ABSTRACT

An optical disc device and tracking control method capable of stable tracking control even for inferior optical discs with tracks decentered by a large amount. The optical disc device and tracking control method includes: obtaining a rotation angle at which the degree of displacement of the track due to the eccentricity of the optical disc becomes maximum on the inner circumference side and the outer circumference side, and detecting the eccentricity amount of the optical disc; and performing track pull-in at the rotation angle, at which the degree of displacement of the track due to the eccentricity of the optical disc becomes maximum, detecting a displacement direction of the optical disc at the time of the pull-in, and moving the slider in the detected displacement direction for a distance equal to or almost equal to the eccentricity amount of the optical disc.

10 Claims, 14 Drawing Sheets

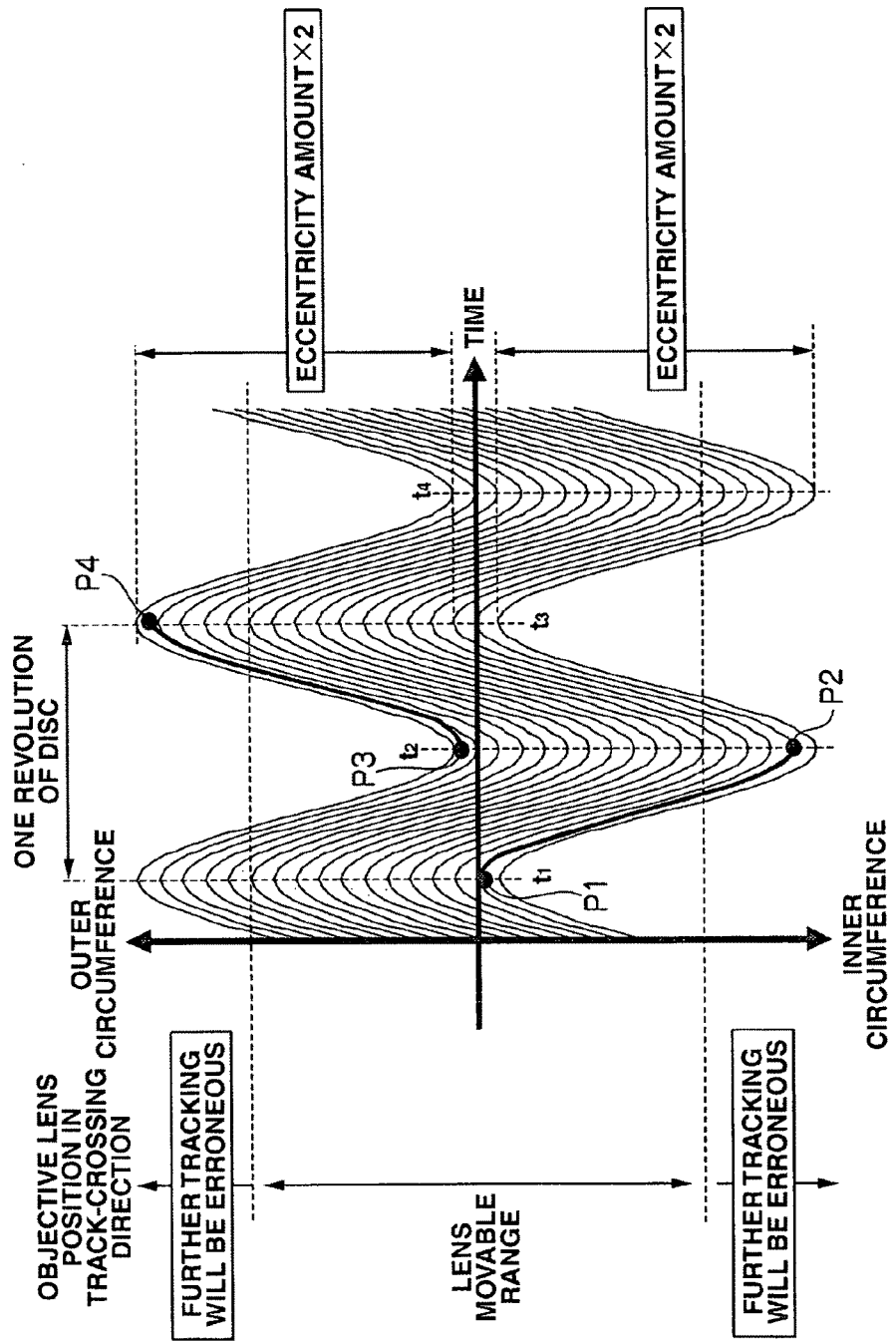

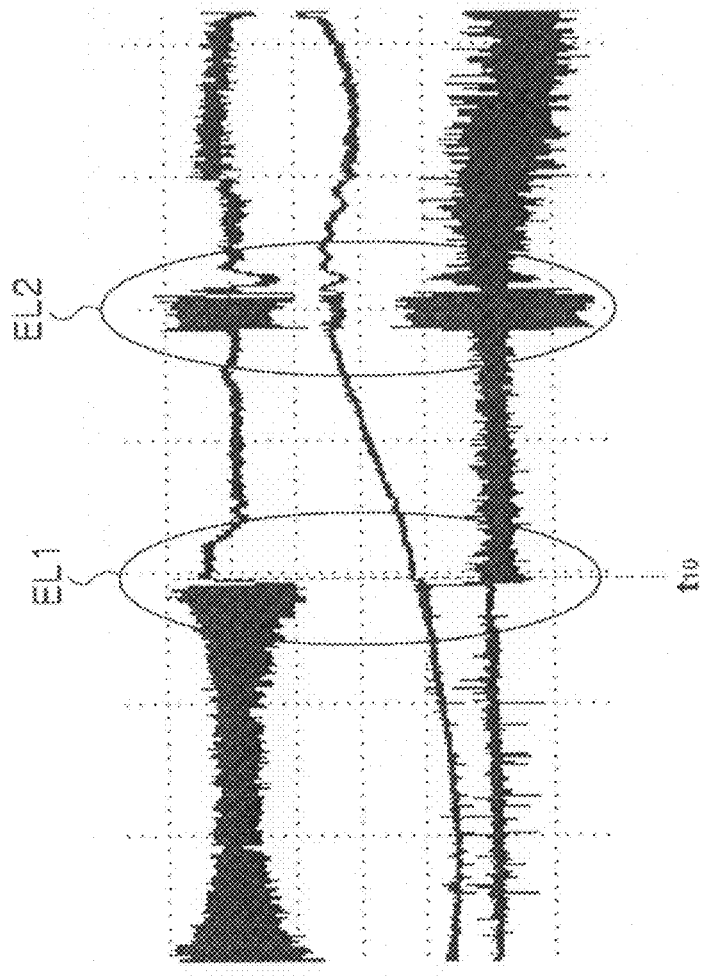

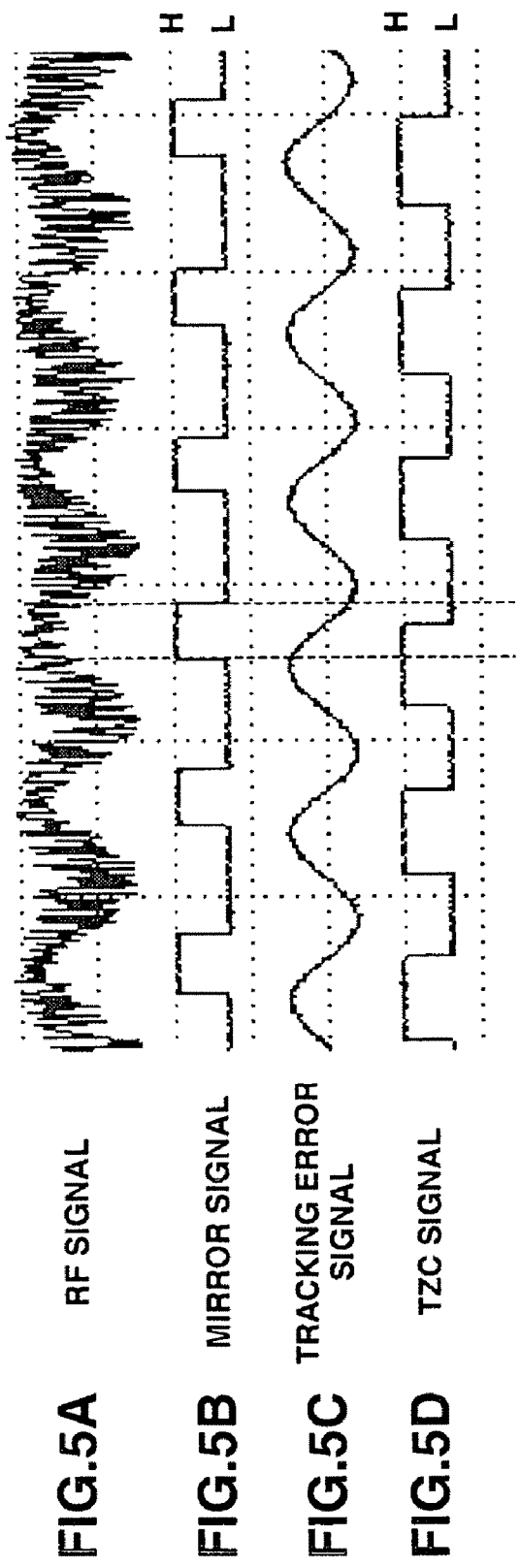

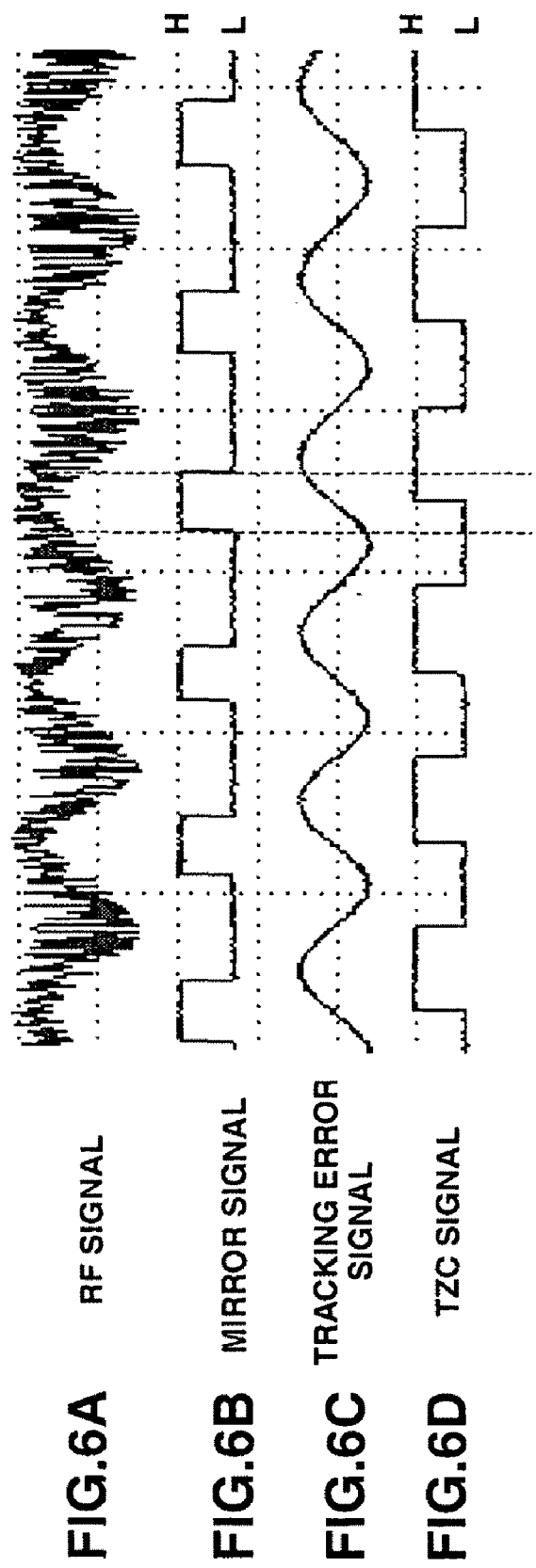
FIG.6A  RF SIGNAL
FIG.6B  MIRROR SIGNAL
FIG.6C  TRACKING ERROR SIGNAL
FIG.6D  TZC SIGNAL

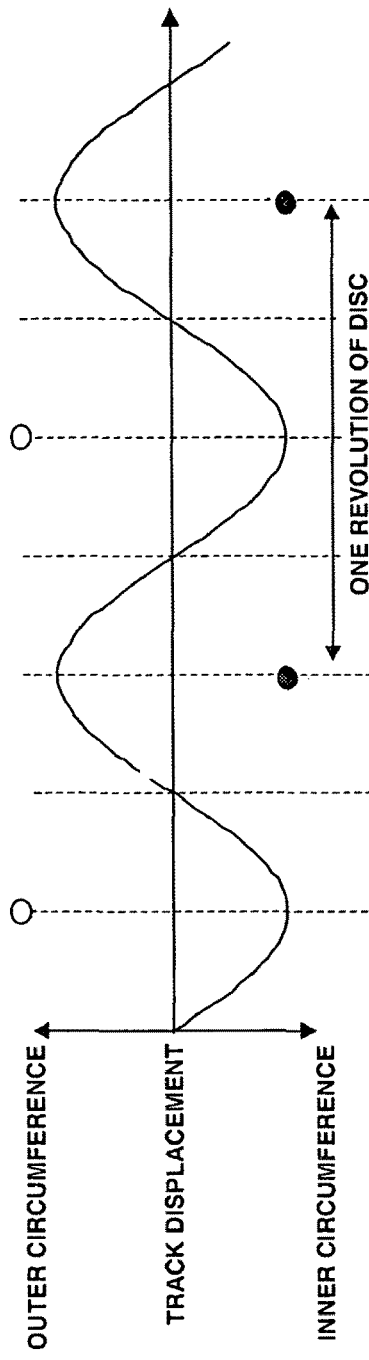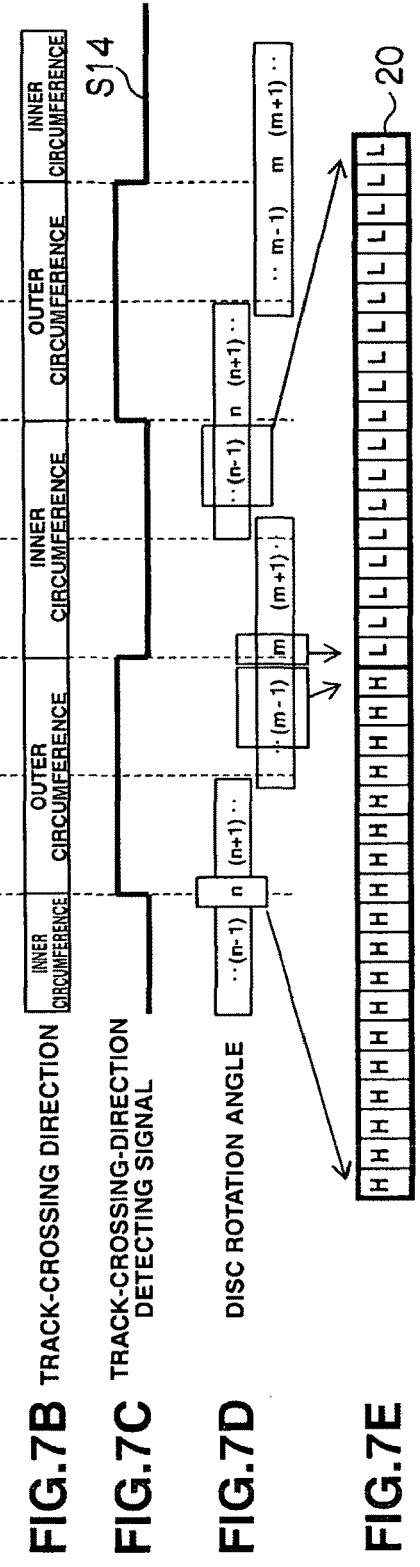
FIG.7A TRACK DISPLACEMENT
FIG.7B TRACK-CROSSING DIRECTION
FIG.7C TRACK-CROSSING-DIRECTION DETECTING SIGNAL
FIG.7D DISC ROTATION ANGLE
FIG.7E
FIG.7F

FIG. 11A TRACKING ERROR SIGNAL

FIG. 11B TRACK-CROSSING-DIRECTION DETECTING SIGNAL

FIG. 11C DISC ROTATION ANGLE

OPTICAL DISC DEVICE AND TRACKING AND SLIDER CONTROL METHOD

CROSS-REFERENCE TO RELATED APPLICATION(S)

This application relates to and claims priority from Japanese Patent Application No. 2007-145512, filed on May 31, 2007, the entire disclosure of which is incorporated herein by reference.

BACKGROUND OF THE INVENTION

The invention relates to an optical disc device and a tracking and slider control method and is ideal for use in, for example, an optical disc device capable of high-speed recording/reproduction and high-density recording/reproduction.

DESCRIPTION OF RELATED ART

Conventionally, tracking control for an eccentricity of an optical discs is performed as outlined below.

First, track-crossing frequency due to an eccentricity of an optical disc is detected when the tracking servo is turned off; and then the tracking servo is turned on, i.e., track pull-in is performed when the track-crossing frequency reaches the lowest value (i.e., when the track is displaced, due to the eccentricity, at maximum toward the inner circumference side or the outer circumference side of the optical disc) and also when an objective lens is not moved from its neutral position.

Subsequently, a tracking actuator is activated to start tracking control by having the objective lens follow the track and moving the objective lens toward the radial direction of the optical disc. Thereafter, the neutral position of the objective lens is moved to a center position of the track displaced due to the eccentricity of the optical disc by activating a slider based on an average value of a driving signal for the tracking actuator per one revolution of the optical disc.

Then, the tracking control is performed by moving the objective lens to make it follow the track. (See Japanese Patent Application Laid-Open (Kokai) Publication No. 2005-216441.)

The conventional tracking control method described above has a problem, i.e., information for moving the neutral position of the objective lens to the center position of the track displaced due to the eccentricity of the optical disc can be obtained only after one or more revolutions of the optical disc after track pull-in.

That conventional tracking control method can be sufficiently effective for practical use as long, as the eccentricity amount of an optical disc is within the movable range of an objective lens (the range within which the objective lens can be moved). However, in the case of an inferior optical disc whose eccentricity amount exceeds the movable range of the objective lens, moving of the objective lens cannot follow runout of the optical disc attributable to the eccentricity of the optical disc and, therefore, the tracking control cannot be performed.

Japanese Patent Application Laid-Open (Kokai) Publication No. 2005-216441 mentioned above discloses, as a method for stabilizing a tracking servo for an optical disc with tracks decentered by a large amount, a method for irradiating the rotating optical disc with a laser beam while the tracking servo is off; obtaining and storing the eccentricity amount and a track runout cycle of the optical disc based on the number of tracks the laser beam crosses at that time, and a period for one pass across the optical disc; and after track pull-in, activating a slider to have an optical pickup follow the track displaced due to the eccentricity of the optical disc based on the stored eccentricity amount and period.

However, if the above-described method is used for high-speed recording/reproduction of an optical disc or for recording/reproduction of a high-density disc such as a Blu-ray Disc (BD), controlling the slider to have it follow the track displaced due to the eccentricity of the optical disc, and concurrently performing tracking control by activating a tracking actuator require cumbersome control processing, resulting in a problem of making the tracking servo instable and a heavy load on a controller in charge of the tracking control.

BRIEF SUMMARY OF THE INVENTION

The present invention was devised in light of the circumstances described above. The invention aims to suggest an optical disc device and tracking and slider control method capable of performing stable tracking control for even inferior optical discs with tracks decentered by a large amount.

In order to achieve the above-described object according to an aspect of the invention, provided is an optical disc device performing tracking and slider control by turning tracking servo on at specified timing to perform track pull-in, performing tracking control after the track pull-in by moving an object lens, and moving a slider in a radial direction with respect to the optical disc based on moving of the objective lens. The optical disc device includes: a disc rotation angle obtaining processing unit for obtaining a rotation angle at which the degree of displacement of the track on the optical disc due to the eccentricity of the optical disc becomes maximum on the inner circumference side and the outer circumference side, and for detecting the eccentricity amount of the optical disc; and a slider movement processing unit for performing the track pull-in at the rotation angle, at which the degree of displacement of the track on the optical disc due to the eccentricity of the optical disc becomes maximum, detecting a current (at that time) track displacement direction of the optical disc, and moving the slider in the detected displacement direction for a distance equal to or almost equal to the eccentricity amount of the optical disc.

According to another aspect of the invention, provided is a tracking and slider control method for turning tracking servo on at specified timing to perform track pull-in, performing tracking control after the track pull-in by moving an object lens, and moving a slider in a radial direction with respect to the optical disc based on moving of the objective lens. The tracking and slider control method includes: a first step of obtaining a rotation angle at which the degree of displacement of the track due to the eccentricity of the optical disc becomes maximum on the inner circumference side and the outer circumference side, and detecting the eccentricity amount of the optical disc; and a second step of performing the track pull-in at the rotation angle, at which the degree of displacement of the track on the optical disc due to the eccentricity of the optical disc becomes maximum, detecting a track displacement direction of the optical disc at the time of the pull-in, and moving the slider in the detected displacement direction for a distance equal to or almost equal to the eccentricity amount of the optical disc.

According to this invention, the objective lens can be moved to the center position of a track displacement range being tracked by the track pull-in. Therefore, moving the objective lens so as to follow the track can be performed within the movable range of the objective lens. As a result, it is possible to perform stable tracking control also for an inferior optical disc with tracks decentered by a large amount.

Other aspects and advantages of the invention will be apparent from the following description and the appended claims.

BRIEF DESCRIPTION OF THE DRAWINGS

FIG. 3 is a waveform diagram for explaining displacement of a track in terms of time due to the eccentricity of the optical disc.

FIGS. 4(A) to (C) are waveform diagrams for explaining instability of a tracking error signal due to displacement of the track beyond a movable range of an objective lens.

FIGS. 5(A) to (D) are waveform diagrams for explaining a phase relationship between a track-crossing direction, a mirror signal, and a tracking zero cross signal.

FIGS. 6(A) to (D) are waveform diagrams for explaining a phase relationship between the track-crossing direction, the mirror signal, and the tracking zero cross signal.

FIGS. 7(A) to (F) are waveform diagrams and conceptual diagrams for explaining a track-crossing-direction detecting signal, a disc rotation angle map, and a slider movement operation instruction map.

DETAILED DESCRIPTION OF PREFERRED EMBODIMENTS

An embodiment of the present invention will be explained below with reference to the relevant drawings.

Figure 1:
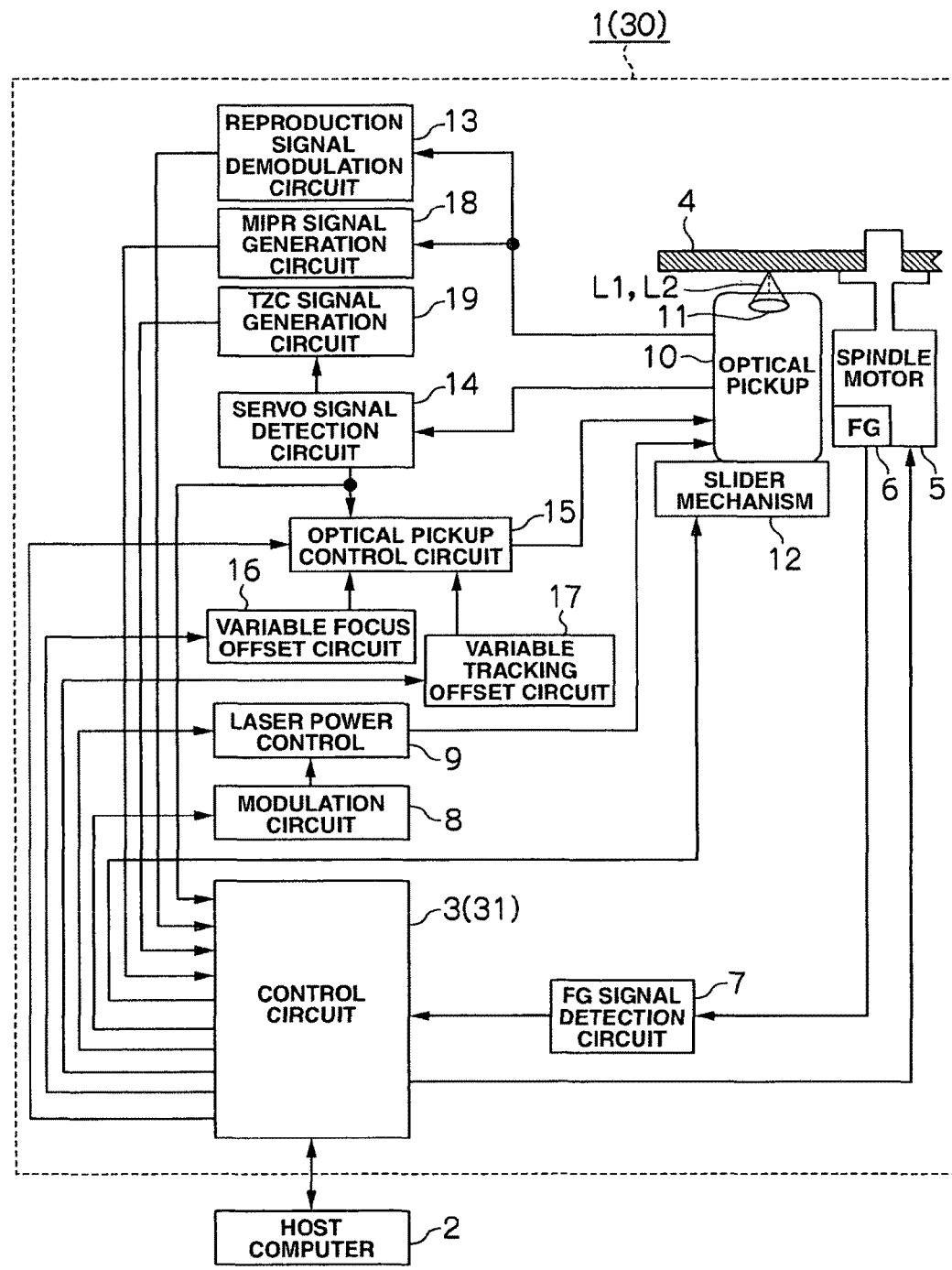
FIG. 1 is a block diagram illustrating the configuration of an optical disc device according to the first embodiment of the present invention.

(1) First Embodiment (1-1) Configuration of Optical Disc Device According to First Embodiment Referring to FIG. 1, reference numeral "1" as a whole represents an optical disc device according to the first embodiment of the present invention. This optical disc device 1 is designed so that it can, in response to a request from a host computer 2, record data on an optical disc 4 or reproduce data recorded on the optical disc 4.

Specifically speaking, with this optical disc device 1, various commands sent from the host computer 2 are supplied to a control circuit 3. The control circuit 3 has a microcomputer configuration equipped with a CPU (Central Processing Unit) and internal memory storing various control programs. The control circuit 3 executes necessary control processing and arithmetic processing according to commands from the host computer 2 and various information supplied from various circuits in the optical disc device 1.

For example, after receiving a recording command from the host computer 2, the control circuit 3 activates a spindle motor 5 to rotate the optical disc 4 mounted in the optical disc device 1 as specified. At that point in time, a rotary encoder 6 attached to the spindle motor 5 generates pulses every time the output axis of the spindle motor 5 rotates by a specified angle (this specified angle is hereinafter defined as "10 degrees"), and the rotary encoder 6 sends the generated pulses as a Frequency Generator (FG) signal to an FG signal detection circuit 7.

The FG signal detection circuit 7 binarizes the supplied FG signal and then sends the obtained binarized FG signal to the control circuit 3. As a result, the control circuit 3 controls the spindle motor 5 based on this binarized FG signal to rotate the optical disc 4 mounted in the optical disk device 1 as specified, according to a recording method for the optical disc 4 (such as the CAV method or the CLV method).

The control circuit 3 also sends target data to be recorded sent from the host computer 2 (hereinafter referred to as the "target data") together with a recording command, to a modulation circuit 8. The modulation circuit 8 executes specified processing for modulating the supplied target data, such as modulation processing using a (1, 7) Run Length Limited (RLL) code, a (2, 7) RLL code, or a (2, 10) RLL code, and sends the obtained modulation signal to a laser power control circuit 9.

The laser power control circuit 9 executes processing for amplifying the supplied modulation signal and then applies the modulation signal thus obtained as a driving signal to a laser diode (not shown in the drawing) in an optical pickup 10. As a result, a laser beam L1 that is space-modulated based on the driving signal is emitted from the laser diode, and this laser beam L1 is focused via an objective lens 11 onto a recording surface of the optical disc 4. At the same time, the control circuit 3 activates a slider mechanism 12 to move a slider, on which the optical pickup 10 is fixed, in a radial direction of the optical disc 4 at a specified speed. As a result, the target data is recorded on the optical disc 4.

Light L2 of the laser beam L1 reflected from the optical disc 4 is led via the objective lens 11 to a photodetector (not shown in the drawing) in the optical pickup 10 and then undergoes photoelectric conversion by this photodetector. Subsequently, a Radio Frequency (RF) signal obtained as a result of this photoelectric conversion undergoes digital conversion via an analogue-digital conversion circuit (not shown in the drawing) in the optical pickup 10, and the obtained digital RF signal is supplied to a reproduction signal demodulation circuit 13.

The reproduction signal demodulation circuit 13 executes specified processing for demodulating the supplied digital RF signal, such as processing for demodulating the (1, 7) RLL code, the (2, 7) RLL code, or the (2, 10) RLL code, and then sends the reproduction data thus obtained to the control circuit 3. As a result, the control circuit 3 controls the laser power control circuit 9 based on this reproduction data and adjusts an amplification factor for the modulation signal at the laser power control circuit 9 so that recording power at that time becomes a target value previously set for Auto Power Control (APC).

The optical pickup 10 sends a servo signal obtained by the photoelectric conversion to a servo signal detection circuit 14. The servo signal detection circuit 14 generates a focus error signal and a tracking error signal based on the supplied servo signal, and sends the focus error signal and the tracking error signal to an optical pickup control circuit 15.

At this point in time, the optical pickup control circuit 15 receives a focus offset signal and a tracking offset signal, from a variable focus offset circuit 16 and a variable tracking offset circuit 17 respectively, for offsetting a focus position and a tracking position from their reference positions in order to correct product irregularity in terms of focus control and tracking control.

Subsequently, the optical pickup control circuit 15 generates a focus actuator driving signal and a tracking actuator driving signal based on the focus error signal and the tracking error signal supplied from the servo signal detection circuit 14, as well as the focus offset signal and the tracking offset signal supplied from the variable focus offset circuit 16 and the variable tracking offset circuit 17 respectively. The optical pickup control circuit 15 then sends the focus actuator driving signal and the tracking actuator driving signal to a focus actuator and a tracking actuator (not shown in the drawing) in the optical pickup 10.

The focus actuator moves the objective lens 11 in a direction approaching the optical disc 4 or in a direction away from the optical disc 4 based on the focus actuator driving signal, and the tracking actuator is activated to move the objective lens 11 toward the radial direction of the optical disc 4 based on the tracking actuator driving signal. As a result, the laser beam L1 emitted from the optical pickup 10 is focused onto the recording surface of the optical disc 4, and focus control and tracking control is performed to make the laser beam L1 scan the track of the optical disc 4.

On the other hand, when receiving a reproduction command from the host computer 2, the control circuit 3 rotates the optical disc 4 mounted in the optical disc device 1 as specified, according to the recording method of the optical disc 4 in the same manner as in the aforementioned recording mode.

The control circuit 3 also controls the laser power control circuit 9 to apply a driving signal of a constant voltage level to the laser diode in the optical pickup 10. As a result, a laser beam L1 having specified power is emitted from the laser diode based on the driving signal, and this laser beam L1 is focused via the objective lens 11 onto the recording surface of the optical disc 4. The control circuit 3 also controls the slider mechanism 12 to move the slider at a specified speed in a radial direction of the optical disc 4.

When this happens, the light L2 of the laser beam L1 reflected from the optical disc 4 is led via the objective lens 11 to the photodetector in the optical pickup 10. This reflected light L2 undergoes photoelectric conversion by the photodetector, resulting in an RF signal. This RF signal undergoes digital conversion and is then sent as a digital RF signal to the reproduction signal demodulation circuit 13 and a mirror circuit 18.

The reproduction signal demodulation circuit 13 executes processing, in the same manner as in the recording mode, for demodulating the supplied digital RF signal and then sends reproduction data thus obtained to the control circuit 3. As a result, this reproduction data is sent from the control circuit 3 to the host computer 2.

The mirror circuit 18 generates, based on the supplied digital RF signal, a mirror signal (see FIGS. 5(B) and 6(B)) that falls to "L" when data is being recorded on the track scanned by the laser beam L1, and that rises to "H" when data is not being recorded on the track. The mirror circuit 18 sends this mirror signal to the control circuit 3. This mirror signal is used, as described later in detail, when obtaining the rotation angle of the optical disc 4 at which the degree of displacement of the track due to the optical disc 4 track decentering becomes maximum on the inner circumference side and the outer circumference side.

Furthermore, the optical pickup 10 sends the servo signal obtained as a result of the photoelectric conversion to the servo signal detection circuit 14. Consequently, based on this servo signal, the servo signal detection circuit 14 generates the focus error signal and the tracking error signal in the same manner as in the recording mode; and then the optical head control circuit 15 performs focus control and tracking control based on the focus error signal and the tracking error signal.

The tracking error signal generated by the servo signal detection circuit 14 is also supplied to a track zero cross signal generation circuit 19. The track zero cross signal generation circuit 19 generates a track zero cross signal (see FIGS. 5(D) and 6(D)) that rises or falls when the signal level for the supplied tracking error signal becomes "0"; and the track zero cross signal generation circuit 19 sends this track zero cross signal to the control circuit 3. This track zero cross signal is used, like the mirror signal, as described later in detail when obtaining the rotation angle of the optical disc 4 at which the degree of displacement of the track due to the optical disc 4 track decentering becomes maximum on the inner circumference side and on the outer circumference.

(1-2) Tracking Control Method According to First Embodiment

A tracking control method utilized in the above-described optical disc device 1 will be explained below.

Figure 2:
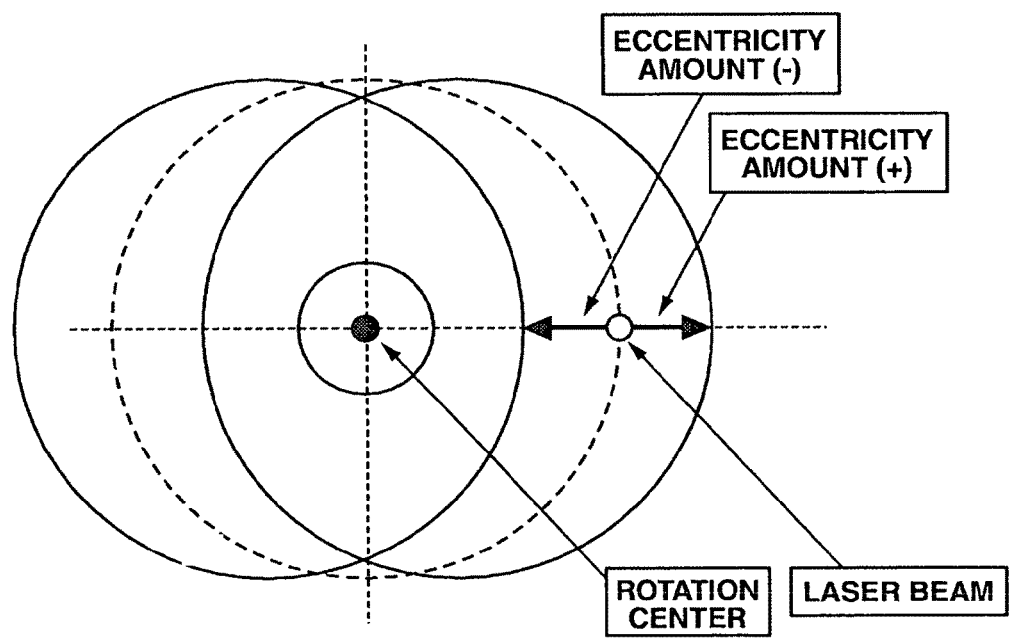
FIG. 2 is a conceptual diagram for explaining the eccentricity amount of an optical disc.

First, the "eccentricity amount" of the optical disc 4 will be explained below. The "eccentricity amount" of the optical disc 4 according to the first embodiment means the decentered degree of the rotation center of the optical disc 4. As shown in FIG. 2, this "eccentricity amount" corresponds to the displaced amount of the optical disc (track) from the laser beam L1 as the center. The displaced amount of the optical disc 4 (track) when the optical disc 4 has rotated a half revolution can be measured as the "eccentricity amount." When the optical disc 4 has rotated one revolution, the "eccentricity amount (eccentricity amount (+))" in the outer-circumferential direction and the "eccentricity amount (eccentricity amount (−))" in the inner-circumferential direction appear, and these eccentricity amounts can be considered as being the same size.

FIG. 3 shows the relationship between the position of each track of the optical disc 4 as seen from the optical pickup 10 (y axis) and time (x axis) when the optical pickup 10 is positioned opposite the optical disc 4 while rotating the decentered optical disc 4 and keeping the tracking servo off.

When the optical disc 4 is decentered as shown in FIG. 3, the track is displaced an amount equivalent to the eccentricity amount of the optical disc 4 after one-revolution period of the optical disc 4. As a result, if track pull-in is performed when the track is displaced at maximum due to the optical disc 4 track decentering (at time t1, t2, and so on), and after the optical disc 4 has rotated a half revolution, the track for which the pull-in has been performed, is displaced to a position away from the pull-in position for a distance equivalent to twice as large as the eccentricity amount of the optical disc 4. Referring to FIG. 3, P1 and P3 represent points where the track pull-in is performed, and P2 and P4 represents the positions of the points P1 and P3 respectively after a half revolution of the optical disc.

FIG. 4 shows waveforms of a tracking error signal (FIG. 4(A)) and a tracking actuator driving signal (FIG. 4 (C)) at that time, and a waveform of a lens error signal (FIG. 4 (B)) that indicates the moved amount of the objective lens 11. The lens error signal is "0" when the objective lens 11 is not moved from its neutral position; and the lens error signal shows a negative signal level of the size corresponding to the moved amount of the objective lens 11 when the objective lens 11 is moved toward the inner circumference side of the optical disc 4; and the lens error signal shows a positive signal level of the size corresponding to the moved amount of the objective lens 11 when the objective lens 11 is moved toward the outer circumference side of the optical disc 4.

As is apparent from FIG. 4, since the tracking servo is off until the track-pull-in is performed (before time t10), the tracking error signal is extremely unstable, but the tracking actuator driving signal shows no instability other than noise. However, after the track pull-in is performed at time t10, the tracking servo is turned on and, therefore, the tracking error signal S1 (図中にS1の記載なし) becomes stable and, to the contrary, the tracking actuator driving signal becomes unstable (see the area surrounded by ellipse EL1).

If the track being tracked at that time moves due to the optical disc 4 track decentering and the displaced amount exceeds the movable range of the objective lens 11, tracking can no longer be performed and the tracking error signal and the tracking actuator driving signal become extremely unstable (see the area surrounded by ellipse EL2). This unstable tracking error signal becomes stable when tracking is resumed as the track reenters the movable range of the objective lens 11. However, at this point in time, there is a possibility that the optical pickup 10 may be tracking a track different from the previous track.

If the optical disc 4 is decentered to the degree exceeding the movable range of the objective lens 11 as described above, a problem of no longer being able to track or to perform precise tracking control occurs.

Therefore, in order to realize stable tracking control after the track pull-in, the optical disc device 1 according to the first embodiment obtains a rotation angle of the optical disc 4, at which the degree of displacement of the track due to the optical disc 4 track decentering becomes maximum on the inner circumference side and the inner circumference side, and also obtains the eccentricity amount of the optical disc 4 (disc rotation angle obtaining processing). The optical disc device 1 performs the track pull-in at the rotation angle of the optical disc 4, at which the degree of displacement of the track due to the optical disc 4 track decentering becomes maximum, detects the track displacement direction of the optical disc 4 at the time of the track pull-in, and activates the slider mechanism 12 to move the slider in the displacement direction for a distance equal to or almost equal to the eccentricity amount of the optical disc 4 (for example, within ±30% error range with respect to the eccentricity amount) (slider movement processing).

Specifically speaking, at the position where the degree of displacement of the track due to the optical disc 4 track decentering becomes maximum, the track displacement direction switches between a direction from the inner circumference side of the optical disc 4 toward its outer circumference side and a direction from the outer circumference side toward the inner circumference side. In order to determine the track displacement direction of the optical disc 4 after the above-described switching, the optical pickup 10 emits the laser beam L1 to irradiate the optical disc 4 while rotating the optical disc 4 at a constant speed and keeping the tracking servo off. Then, the time when the degree of displacement of the track due to the optical disc 4 track decentering becomes maximum is detected as the time when the direction in which the laser beam L1 crosses the track (hereinafter referred to as the "track-crossing direction") changes due to the displacement of the optical disc 4.

In this case, the mirror signal and the tracking zero cross signal that can be obtained by irradiating the optical disc 4 with the laser beam L1 can be utilized as a means of detecting when the track-crossing direction changes. This will be explained with reference to FIGS. 5 and 6.

FIG. 5 shows the RF signal (FIG. 5(A)), the mirror signal (FIG. 5(B)), the tracking error signal (FIG. 5(C)), and the track zero cross signal (FIG. 5(D)) when the track-crossing direction is toward the outer-circumferential direction of the optical disc 4. FIG. 6 shows the RF signal (FIG. 6(A)), the mirror signal (FIG. 6(B)), the tracking error signal (FIG. 6(C)), and the track zero cross signal (FIG. 6(D)) when the track-crossing direction is toward the inner-circumferential direction of the optical disc 4.

As is apparent from FIGS. 5 and 6, the phase of the tracking zero cross signal with respect to the mirror signal when the track-crossing direction is toward the outer-circumferential direction of the optical disc 4 (FIG. 5) is different from the phase of the tracking zero cross signal with respect to the mirror signal when the track-crossing direction is toward the inner-circumferential direction of the optical disc 4 (FIG. 6).

Specifically speaking, if the track-crossing direction is toward the outer-circumferential direction of the optical disc 4, the logical level for the tracking zero cross signal is "H" at the moment that the mirror signal rises to "H." If the track-crossing direction is toward the inner-circumferential direction of the optical disc 4, the logical level for the tracking zero cross signal is "L" at the moment that the mirror signal rises to "H."

Therefore, during the aforementioned disc rotation angle obtaining processing, the optical disc device 1 generates, based on the mirror signal and the tracking zero cross signal and for the optical disc 4 whose track is displaced due to the eccentricity as shown in FIG. 7(A), a track-crossing-direction detecting signal that rises to "H" during a period when the track-crossing direction of the laser beam L1 is toward the outer-circumferential direction of the optical disc 4, and that falls to "L" during a period when the track-crossing direction of the laser beam L1 is toward the inner-circumferential direction of the optical disc 4 as shown in FIGS. 7(B) and 7(C).

The optical disc device 1 also creates a disc rotation angle map 20 as shown in FIG. 7(E) based on the track-crossing-direction detecting signal and the binarized FG signal output from the FG signal detection circuit 7 (FIG. 1). This disc rotation angle map 20 is a bit map for which the logical level for the track-crossing-direction detecting signal ("L" or "H") is sampled every time the rotary encoder 6 (FIG. 1) outputs a pulse (i.e., every time the optical disc 4 rotates by 10 degrees), and in which the obtained sampling values for one revolution of the optical disc 4 (i.e., 36 sampling values) are arranged in the order obtained. As a result, the current displacement direction of the objective lens 11 (track displacement direction) can be detected based on this disc rotation angle map 20 and the current rotation angle of the optical disc 4.

Furthermore, during the aforementioned disc rotation angle obtaining processing, the optical disc device 1 irradiates the optical disc 4 with the laser beam L1 while rotating the optical disc 4 and keeping the tracking servo off, and then the optical disc device 1 finds the eccentricity amount of the optical disc 4 based on the number of tracks crossed by the laser beam L1 during one revolution of the optical disc 4 (hereinafter referred to as the "track-crossing number"). Specifically speaking, since a track pitch for the optical disc 4 is previously defined according to the standards, the eccentricity amount can be obtained by the following formula where "PH" represents the track pitch and "N" represents the track-crossing number:

Formula 1

$$pp = (PH \times N)/4 \qquad (1)$$

Subsequently, the optical disc device 1 performs the track pull-in and then determines, as the slider movement processing, the current displacement direction of the optical disc 4 based on the disc rotation angle map 20 obtained as a result of the disc rotation angle obtaining processing.

If the optical disc device 1 determines that the objective lens 11 is moved toward the inner-circumferential direction of the optical disc 4 (i.e., the optical disc 4 is displaced toward the inner-circumferential direction), the optical disc device 1 activates the slider mechanism 12 to move the optical pickup 10 integrally with the slider toward the inner-circumferential direction of the optical disc 4 for a distance equal to or almost equal to the eccentricity amount of the optical disc 4; or if the optical disc device 1 determines that the objective lens 11 is moved toward the outer-circumferential direction of the optical disc 4 (i.e., the optical disc 4 is displaced toward the outer-circumferential direction), the optical disc device 1 activates the slider mechanism 12 (FIG. 1) to move the optical pickup 10 integrally with the slider toward the outer-circumferential direction of the optical disc 4 for a distance equal to or almost equal to the eccentricity amount of the optical disc 4.

As a result of the above-described processing sequence, the objective lens 11 can be moved to the center position or approximately the center position of the track displacement range of the track onto which the laser beam 1 has been adjusted by the track pull-in.

After moving the optical pickup 10 toward the radial direction of the optical disc 4 for a distance equal to or almost equal to the eccentricity amount of the optical disc 4 as described above, the optical disc device 1 will not execute the above-described processing sequence again. This is because, after the completion of the above-described processing sequence, the objective lens 11 of the optical pickup 10 is located at the center position or almost at the center position of the track displacement range of the track onto which the objective lens 11 has been adjusted as described above; and if the objective lens 11 is located at the above-described position, even if the track being tracked is displaced corresponding to the optical disc 4 track decentering, it can be assumed that the position of the objective lens 11, which is moved so as to follow the track displacement, will not go beyond the movable range of the objective lens 11.

Figure 8:
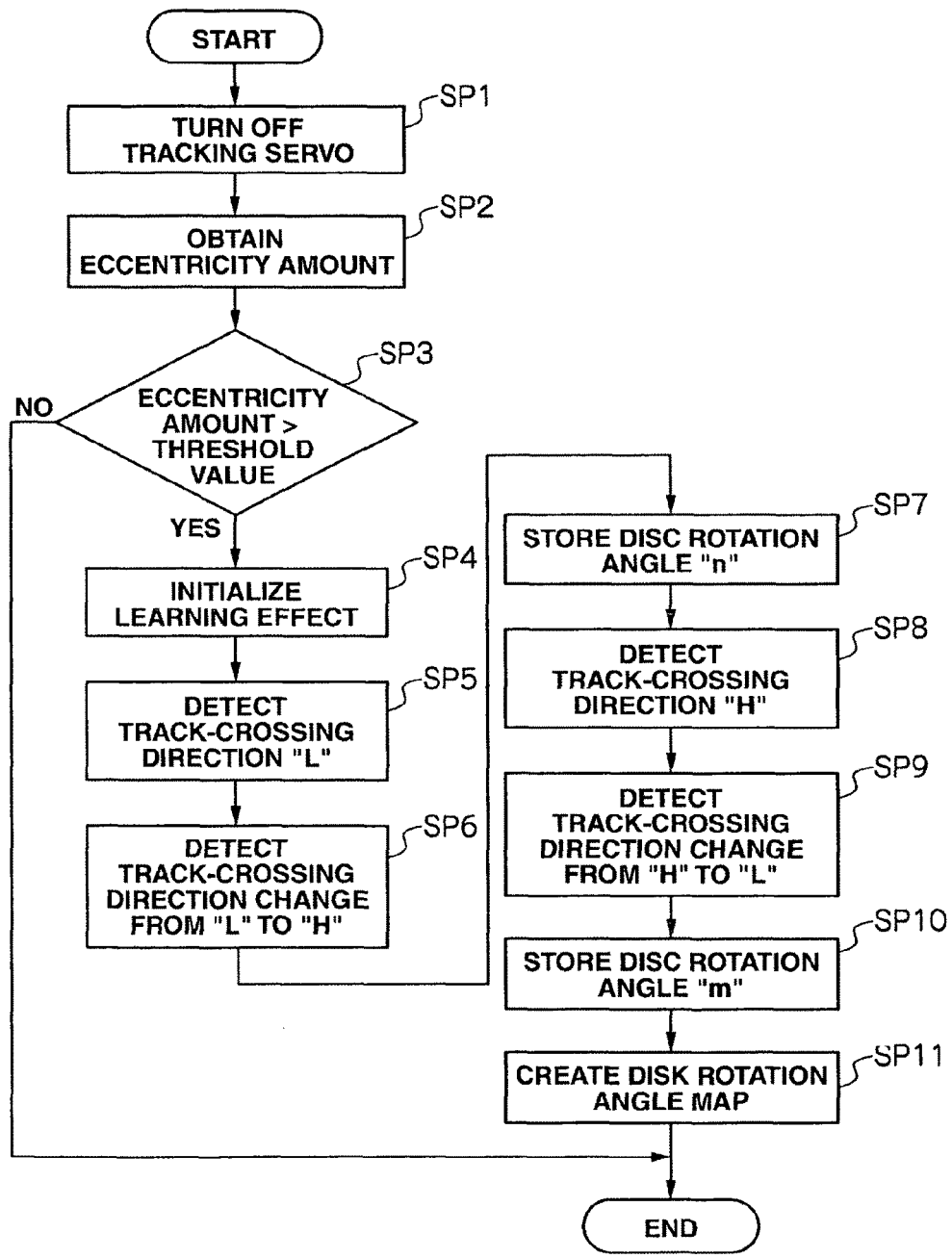
FIG. 8 is a flowchart for explaining disc rotation angle obtaining processing according to the first embodiment.

FIG. 8 is a flowchart illustrating specific details of the disc rotation angle obtaining processing executed by the control circuit 3 by the tracking control method according to the first embodiment described above. The control circuit 3 executes the disc rotation angle obtaining processing shown in FIG. 8 in accordance with the relevant control program stored in the internal memory.

When first accessing the optical disc 4 which is mounted in the optical disc device 1 as specified, the control circuit 3 starts this processing and first turns off the tracking servo by controlling the optical pickup control circuit 15 (FIG. 1) (SP1).

Subsequently, the control circuit 3 obtains the eccentricity amount of the optical disc 4 (SP2). Specifically speaking, the control circuit 3 activates the slider mechanism 12 to move the optical pickup 10 to a specified position opposite the recording surface of the optical disc 4, and then activates the laser power control circuit 9 (FIG. 1) to have the optical pickup 10 emit the laser beam L1 of specified power to irradiate the optical disc 4. Also, the control circuit 3 counts the number of tracks the laser beam L1 has crossed during one revolution of the optical disc 4 based on the binarized FG detecting signal supplied from the FG signal detection circuit 7 (FIG. 1) and the tracking error signal supplied from the servo signal detection circuit 14 (FIG. 1); and based on this count value, the control circuit 3 calculates the eccentricity amount of the optical disc 4 using the aforementioned formula (1).

Then, the control circuit 3 judges whether or not the eccentricity amount of the optical disc 4 obtained in step SP2 is larger than a threshold value that is previously set as a maximum value for the eccentricity amount that can be handled by moving the objective lens (SP3). If step SP3 returns an affirmative judgment, the control circuit 3 terminates this disc rotation angle obtaining processing.

On the other hand, if step SP2 returns a negative judgment, the control circuit 3 initializes the obtained and stored result at that time of the disc rotation angle obtaining processing previously executed (i.e., the disc rotation angle map 20 as described above with reference to FIG. 7(E)) (SP4).

Subsequently, the control circuit 3 generates the track-crossing-direction detecting signal (FIG. 7(C)) based on the mirror signal supplied from the mirror signal generation circuit 18 (FIG. 1) and the track zero cross signal supplied from the track zero cross signal generation circuit 19 (FIG. 1), and detects the track-crossing direction when the logical level for the track-crossing-direction detecting signal becomes "L" (SP5). Based on this detection result, the control circuit 3 detects the time when the logical level for the track-crossing-direction detecting signal changes from 'L' to "H-" (i.e., when the degree of displacement of the optical disc 4 becomes maximum) (SP6).

Next, the control circuit 3 obtains the rotation angle "n" of the optical disc 4 at that time, and stores it as the disc rotation angle at which the logical level for the track-crossing-direction detecting signal changes from "L" to "H" (SP7). Specifically speaking, the control circuit 3 counts, based on the binarized FG signal supplied from the FG signal detection circuit 7 (FIG. 1), the number of pulses output from the rotary encoder 6 (FIG. 1) after every 10-degree revolution of the optical disc 4, using a counter (not shown in the drawing) (hereinafter referred to as the "rotation angle counter"), by clearing the counter every time the optical disc 4 has rotated one revolution (i.e., every time the counter has counted "36"). The control circuit 3 then stores, as the disc rotation angle, the count value of the rotation angle counter when the logical level for the track-crossing-direction detecting signal changes from "L" to "H."

Subsequently, the control circuit 3 detects the track-crossing direction when the logical level for the track-crossing-direction detecting signal generated based on the mirror signal and the track zero cross signal becomes "H" (SP8); and also, based on this detection result, the control circuit 3 detects the time when the logical level for the track-crossingdirection detecting signal changes from "H" to "L" (i.e., when the degree of displacement of the optical disc 4 becomes maximum) (SP9).

The control circuit 3 obtains the rotation angle "m" of the optical disc 4 at that time and stores it as the disc rotation angle at which the logical level for the track-crossing-direction detecting signal changes from "H" to "L" (SP10). Incidentally, the disc rotation angle at that time also stores the count value of the rotation angle counter described above when the logical level for the track-crossing-direction detecting signal changes from "H" to "L."

Subsequently, the control circuit 3 creates the disc rotation angle map 20 described above with reference to FIG. 7(E) based on each disc rotation angle stored in steps SP7 and SP10 (SP11). Specifically speaking, the control circuit 3 creates the disc rotation angle map 20 by setting, from among 36 bits for the disc rotation angle map that are respectively associated with the pulses output from the rotary encoder 6 during one revolution of the optical disc 4, the values of the respective bits ranging from a bit corresponding to the disc rotation angle "n" (the count value of the rotation angle counter) stored in step SP7 to a bit immediately preceding a bit corresponding to the disc rotation angle "m" stored in step SP10, to "H" and setting the remaining bits to "L" respectively. Then, the control circuit 3 terminates this disc rotation angle obtaining processing.

Figure 9:
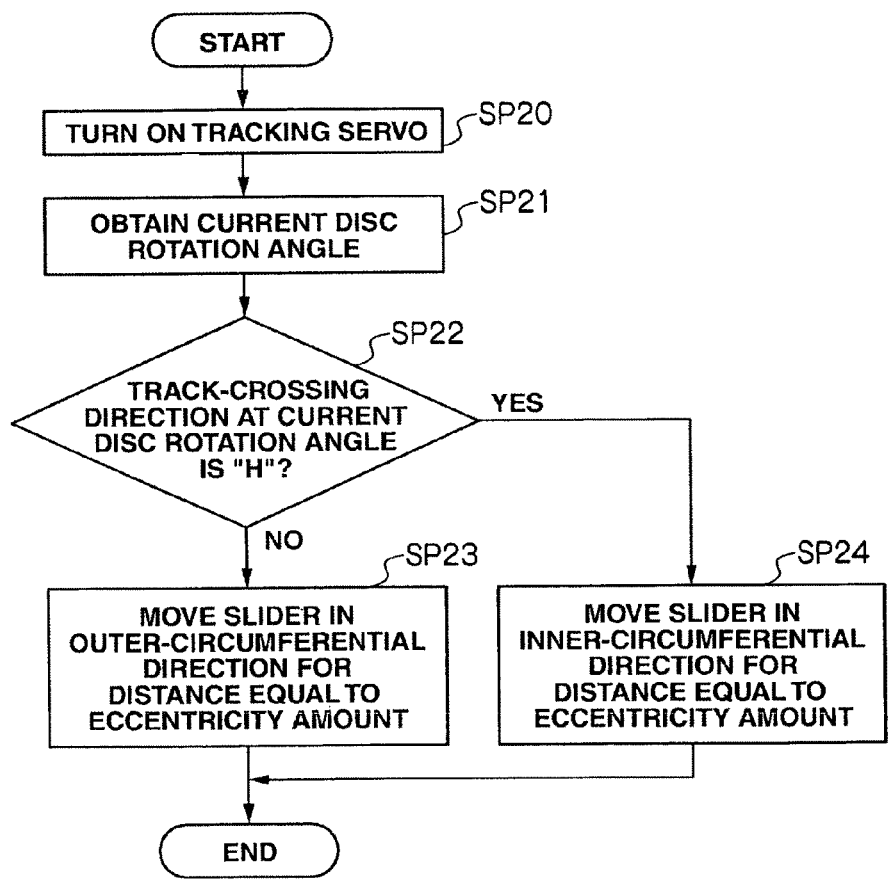
FIG. 9 is a flowchart for explaining slider movement processing according to the first embodiment.

Meanwhile, FIG. 9 is a flowchart illustrating specific details of the slider movement processing executed by the control circuit 3. The control circuit 3 executes the slider movement processing shown in FIG. 9 in accordance with the relevant control program stored in the internal memory.

After terminating the disc rotation angle obtaining processing, the control circuit 3 starts this slider movement processing. When the degree of displacement of the optical disc 4 becomes maximum, the control circuit 3 first controls the servo signal detection circuit 14 (FIG. 1) to turn on the tracking servo (SP20). The control circuit 3 thereby performs the track pull-in.

Subsequently, the control circuit 3 reads the count value of the aforementioned rotation angle counter as the current (i.e., at the time of track pull-in) rotation angle of the optical disc 4 (SP21). The control circuit 3 then judges, based on the disc rotation angle map 20, whether or not the track-crossing direction at this rotation angle is a direction in which the logical level for the track-crossing-direction detecting signal becomes "H" (the direction from the inner circumference of the optical disc 4 toward its outer circumference) (SP22).

If step SP22 returns a negative judgment, the control circuit 3 activates the slider mechanism 12 to move the slider so that the optical pickup 10 will be moved toward the outer-circumferential direction of the optical disc 4 for a distance equal to or almost equal to the eccentricity amount of the optical disc 4 (SP23). Also, if step SP22 returns an affirmative judgment, the control circuit 3 activates the slider mechanism 12 to move the slider so that the optical pickup 10 will be moved toward the inner-circumferential direction of the optical disc 4 for a distance equal to or almost equal to the eccentricity amount of the optical disc 4 (SP24). After that, the control circuit 3 terminates this slider movement processing.

(1-3) Effect of First Embodiment

The optical disc device 1 according to the first embodiment as described above obtains the rotation angle of the optical disc 4 at which the degree of displacement of the track due to the optical disc 4 track decentering becomes maximum on the inner circumference and the outer circumference; finds the eccentricity amount of the optical disc 4; performs track pull-in at the rotation angle of the optical disc 4 at which the degree of displacement of the track due to the optical disc 4 track decentering becomes maximum; detects a displacement direction of the optical disc 4 at the time of this track pull-in; and activates the slider mechanism 12 to move the optical pickup 10 in that displacement direction for a distance equal to or almost equal to the eccentricity amount of the optical disc 4. As a result, the objective lens 11 can be moved to the center position or approximately the center position of the track displacement range being tracked by the laser beam L1 by means of the track pull-in.

Thereafter, the track being tracked at that time is displaced, from the objective lens 11 as the center, for the same distance alternately toward the outer-circumferential direction and toward the inner-circumferential direction of the optical disc 4. Therefore, the objective lens 11 is moved so as to follow the track within the movable range of the objective lens 11. As a result, the optical disc device 1 according to the first embodiment can perform stable tracking control of even an inferior optical disc 4 with tracks decentered by a large amount after the track pull-in.

Figure 10:
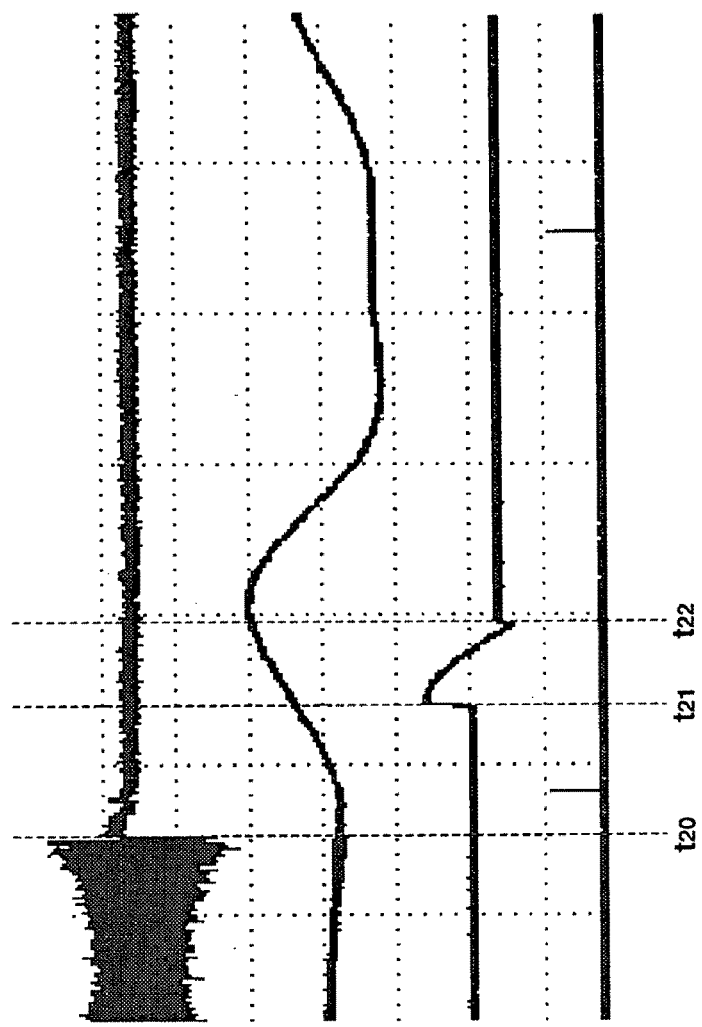
FIGS. 10(A) to (D) are waveform diagrams for explaining the effect of a tracking control method according to the first embodiment.

When simulation was performed to move the optical pickup 10 to the center position of the track displacement range (from time t20 to t21) onto which the laser beam L1 was adjusted after the track pull-in (at time t20) as shown in FIG. 10, it was in fact confirmed that the waveform of the tracking error signal was stable after the optical pickup 10 was moved (at time t21). As a result, it was confirmed that stable tracking control can be performed by the tracking control method according to the first embodiment.

(2) Second Embodiment

Referring to FIG. 1, reference numeral "30" represents an optical disc device according to the second embodiment. This optical disc device 30 is configured in the same manner as the optical disc device 1 according to the first embodiment, except there is some difference in the details of disc rotation angle obtaining processing and slider movement processing executed by a control circuit 31.

Specifically speaking, the optical disc device 1 according to the first embodiment obtains the rotation angle, at which the degree of displacement of the track due to the optical disc 4 track decentering becomes maximum on the inner circumference side and the outer circumference side, by finding when the logical level for the track-crossing-direction detecting signal (FIG. 7(C)) changes. However, as shown in FIG. 11(A), the waveform of the tracking error signal may become unstable before and after the logical level for the track-crossing-direction detecting signal changes (i.e., when the degree of displacement due to the optical disc 4 track decentering becomes maximum).

Figure 11:
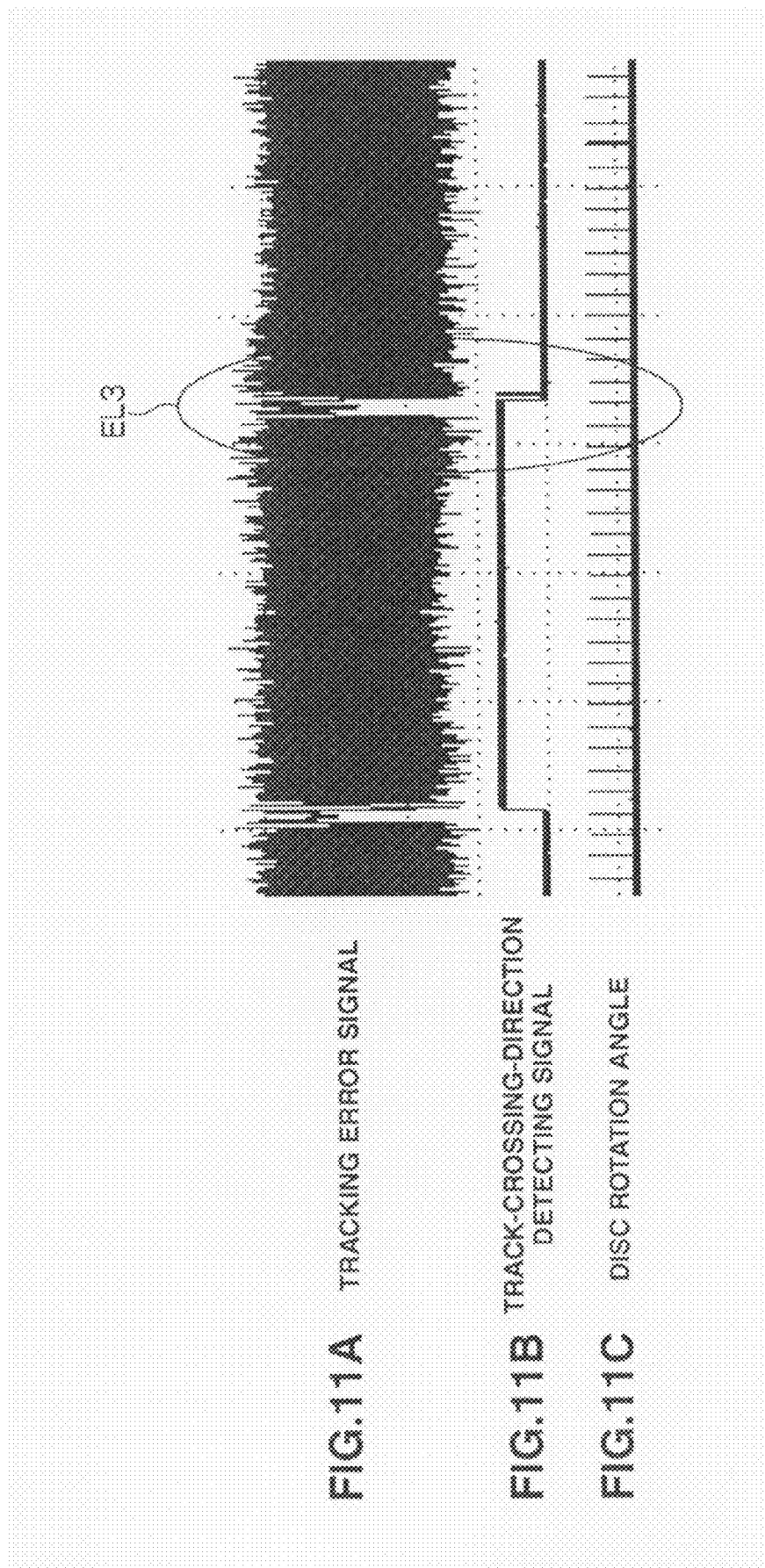
FIGS. 11(A) to (C) are waveform diagrams for explaining instability of the tracking error signal before and after the logical level for the track-crossing-direction detecting signal changes.
Figure 12:
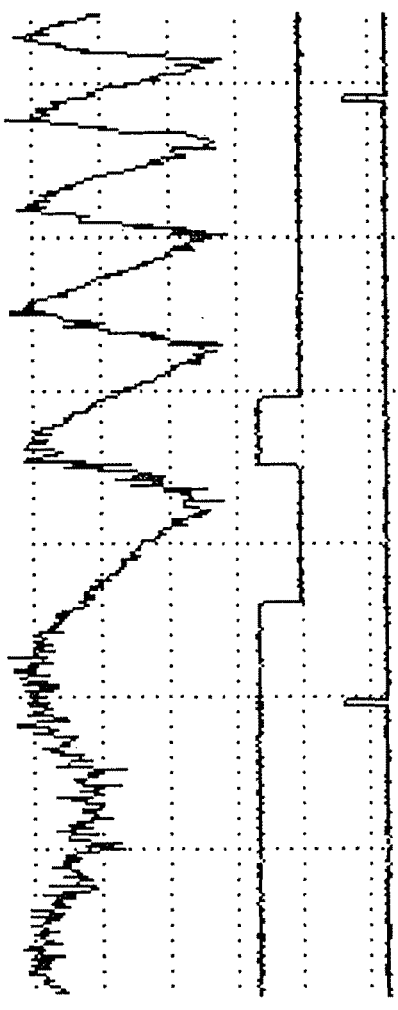
FIGS. 12(A) to (C) are waveform diagrams for explaining instability of the tracking error signal before and after the logical level for the track-crossing-direction detecting signal changes.

In that situation, the waveform of the tracking zero cross signal generated based on the tracking error signal also becomes unstable. Accordingly, the logical level for the track-crossing-direction detecting signal generated based on this tracking zero cross signal also becomes unstable as shown in FIG. 11(B). If obtaining the rotation angle of the optical disc 4 is performed in the above-described situation when the rotary encoder 6 outputs pulses as shown in FIG. 11(C), there is a possibility that the relationship between the rotation angle of the optical disc 4 and the track-crossing detecting signal may be misinterpreted. Incidentally, FIG. 12 is an enlarged view showing the waveforms in the area surrounded by ellipse EL3 in FIG. 11.

If an incorrect relationship between the rotation angle of the optical disc 4 and the track-crossing detecting signal is obtained, the following problem may occur: although the objective lens 11 is moved toward the inner-circumferential direction of the optical disc 4, the slider mechanism 12 is activated to move the optical pickup 10 toward the outer-circumferential direction of the optical disc 4, and in the middle of this movement, the movement of the objective lens 11 may go beyond the movable range of the objective lens 11. In this case, tracking can no longer be performed and the tracking control after the track pull-in becomes unstable.

In order to avoid the above-described situation, the optical disc device 30 according to the second embodiment creates a slider movement operation instruction map 32 as shown in FIG. 7(F). This slider movement operation instruction map 32 is a map composed of 36 areas 32A associated with the respective bits in the disc rotation angle map 20 (FIG. 7(E)). Each area 32A in the slider movement operation instruction map 32 stores an operation instruction code indicating when and how the slider mechanism 12 should be operated based on the results of the disc rotation angle obtaining processing.

In the second embodiment, the following three operation instructions are possible: a "disc rotation angle update waiting instruction" indicating that the operation of the slider mechanism 12 should wait until the optical disc 4 rotates to a rotation position specified by a reliable rotation angle as a result of the rotation angle obtaining processing; a "slider movement instruction" indicating that the slider mechanism 12 may be activated to move the optical pickup 10; and "no instruction" indicating that the slider mechanism 12 should not be activated.

After the optical disc device 30 creates the disc rotation angle map 20, it creates the slider movement operation instruction map 32 by referring to this disc rotation angle map 20; and after the track pull-in the optical disc device 30 moves the optical pickup 10 to the center position of the track displacement range that is the target at that time, the optical disc device 30 reads an operation instruction from the corresponding area 32A in the slider movement operation instruction map 32 based on the rotation angle of the optical disc 4 at the time of the track pull-in, and then activates the slider mechanism 12 in accordance with the operation instruction read.

Figure 13:
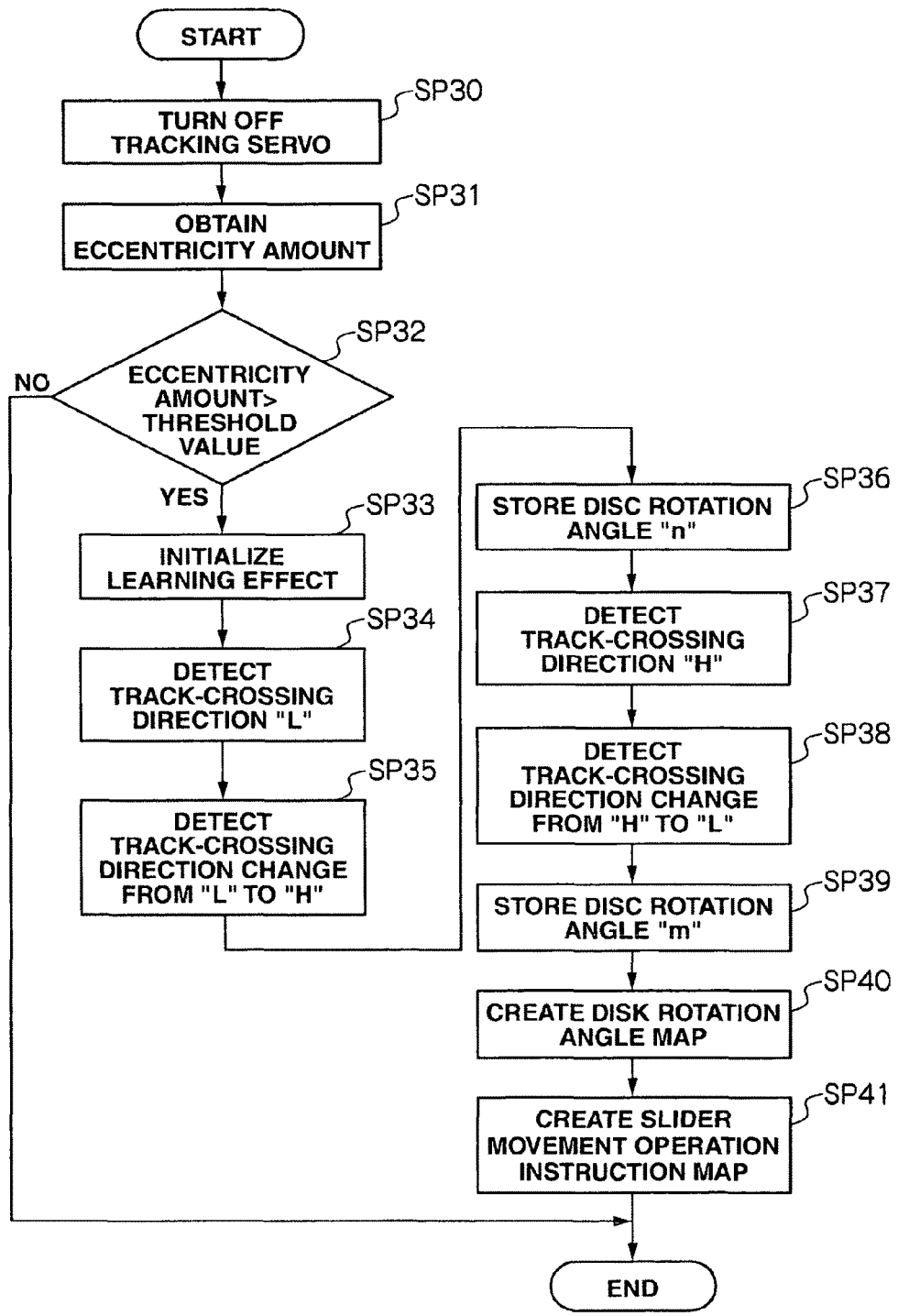
FIG. 13 is a flowchart for explaining disc rotation angle obtaining processing according to the second embodiment.

FIG. 13 is a flowchart illustrating specific details of disc rotation angle learning processing from among tracking control processing executed by the control circuit 31 according to the second embodiment. The control circuit 31 executes the disc rotation angle learning processing shown in FIG. 13 in accordance with the relevant control program stored in the internal memory.

When first accessing the optical disc 4 mounted in the optical disc device 30 as specified, the control circuit 31 starts this processing and follows steps SP30 through SP40 in the same manner as those in steps SP1 through SP11 of the disc rotation angle learning processing according to the first embodiment as described earlier with reference to FIG. 8.

Subsequently, the control circuit 31 creates the slider movement operation instruction map 32 based on the disc rotation angle map 20 created in step SP40 (SP41). Specifically speaking, the control circuit 31 stores, in a map form for the slider movement operation instruction map 32, the "disc rotation angle update waiting instruction" code in each of two areas 32A immediately before, and in each of three areas 32A immediately after, the rotation angle of the optical disc 4 at which the logical level for the track-crossing-direction detecting signal changes from "L" to "H" or from "H" to "L." The control circuit 31 also stores the "slider movement instruction" code in each of six or seven areas 32A following the above-mentioned three areas 32A immediately after the above-described rotation angle, and also stores the "no instruction" code in each of the remaining areas 32A, thereby creating the slider movement operation instruction map 32.

Figure 14:
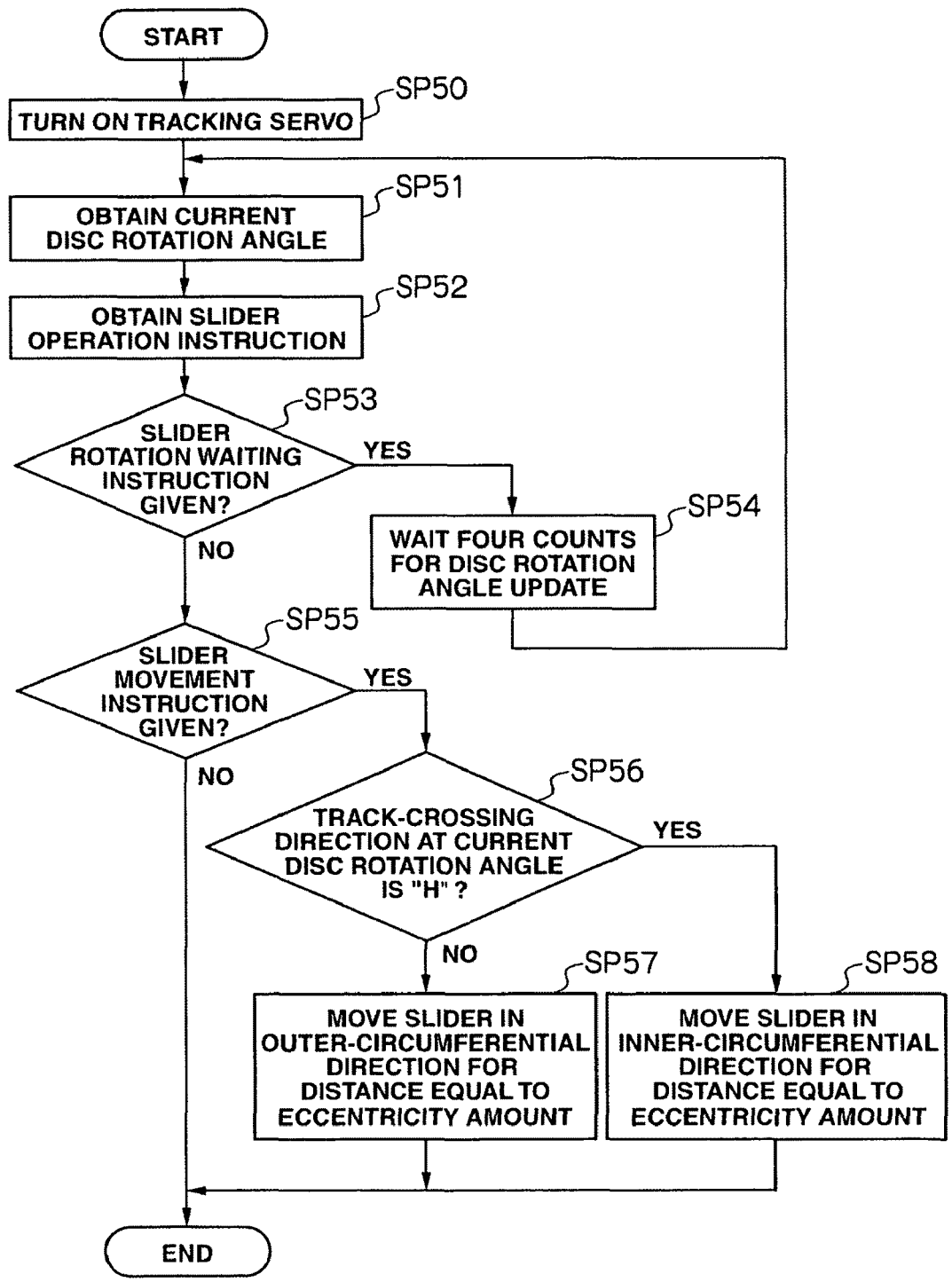
FIG. 14 is a flowchart for explaining slider movement processing according to the second embodiment.

On the other hand, FIG. 14 is a flowchart illustrating specific details of the slider movement processing from among the tracking control processing executed by the control circuit 31 according to the second embodiment. The control circuit 31 executes the slider movement processing shown in FIG. 14 in accordance with the relevant control program stored in the internal memory.

After terminating the disc rotation angle learning processing, the control circuit 31 starts this slider movement processing. The control circuit 31 first performs track pull-in in the same manner as in steps SP20 and SP21 of the slider movement processing according to the first embodiment as described with reference to FIG. 9 (SP50), and then reads the count value of the rotation angle counter described above as the current (i.e., immediately after the track pull-in) rotation angle of the optical disc 4 (SP51).

Subsequently, the control circuit 31 reads the relevant operation instruction code from the slider movement operation instruction map 32 based on the current rotation angle of the optical disc 4 as obtained in step SP51 (SP52), and then judges whether the read code is the "disc rotation angle update waiting instruction" or not (SP53).

If step SP53 returns an affirmative judgment, the control circuit 31 waits four counts counted by the rotation angle counter (SP54). When the rotation angle counter has counted four counts after the above-mentioned affirmative judgment was made, the control circuit 31 returns to step SP51 and then repeats the same processing.

On the other hand, if step S53 returns a negative judgment, the control circuit 31 judges whether the code read from the slider movement operation instruction map 32 in step SP51 is the "slider movement instruction" or not (SP55).

If step SP55 returns a negative judgment, the control circuit 31 terminates this slider movement processing. On the other hand, if step SP55 returns an affirmative judgment, the control circuit 31 then follows steps SP56 through SP58 in the same manner as those in steps SP22 through SP24 of the slider movement processing according to the first embodiment as described earlier with reference to FIG. 9. Subsequently, the control circuit 31 terminates this slider movement processing.

The optical disc device 30 according to the second embodiment as described above creates the slider movement operation instruction map 32, in which the operation instruction is specified for each rotation angle of the optical disc 4, by referring to the disc rotation angle map 20, and activates the slider mechanism 12 in accordance with the relevant operation instruction stored in this slider movement operation instruction map 32 after the track pull-in. As a result, it is possible to reliably prevent utilizing an incorrect relationship between the rotation angle of the optical disc 4 and the track-crossing detecting signal.

Therefore, it is possible to prevent the occurrence of the situation where although the objective lens 11 is moved toward the inner-circumferential direction of the optical disc 4, the slider mechanism 12 is activated to move the optical pickup 10 toward the outer-circumferential direction of the optical disc 4 and, in the middle of this movement, the moved amount of the objective lens 11 exceeds the movable range of the objective lens 11. Therefore, it is possible to perform more stable tracking control than the tracking control method according to the first embodiment.

(3) Other Embodiments

The aforementioned first and second embodiments describe the case where the present invention is utilized in the optical disc device 1 or 30 configured as shown in FIG. 1. However, this invention is not limited to these examples, and can be utilized in a wide variety of optical disc devices having various other configurations.

The aforementioned first and second embodiments describe the case where the same one control circuit 3 or 31 is configured to serve as the disc rotation angle learning processing unit and the slider movement processing unit. However, the present invention is not limited to this example, and the functions of the disc rotation angle learning processing unit and the functions of the slider movement processing unit may be assigned to different circuits.

The aforementioned first and second embodiments describe the case where the rotation angle of the optical disc 4 is detected based on pulses output from the rotary encoder 6. However, the present invention is not limited to this example, and other methods may be utilized.

Moreover, the aforementioned first and second embodiments describe the case where the rotary encoder 6 is designed to output pulses every time the optical disc 4 rotates by 10 degrees. However, the present invention is not limited to this example, and a wide variety of other timings can be utilized as to when the rotary encoder 6 should output pulses.

The aforementioned second embodiment describes the case where the three patterns, i.e., the "disc rotation angle update waiting instruction," the "slider movement instruction," and "no instruction," are defined as the slider movement operation instructions. However, the present invention is not limited to this example, and other patterns, such as an instruction to define a waiting period as the specific number of times the rotation angle counter updates, may be utilized.

While the invention has been described with respect to a limited number of embodiments, those skilled in the art, having benefit of this disclosure will appreciate that other embodiments can be devised that do not depart from the scope of the invention as disclosed herein. Accordingly, the scope of the invention should be limited only by the attached claims.

What is claimed is:

1. An optical disc device performing tracking and slider control by turning a tracking servo on at specified timing to perform pull-in of a track on an optical disc, performing tracking after the track pull-in by moving an object lens in a radial direction with respect to the optical disc, and moving a slider in a radial direction with respect to the optical disc based on moving of the objective lens, the optical disc device comprising:
   a disc rotation angle obtaining processing unit for obtaining a rotation angle at which a degree of displacement of the track due to eccentricity of the optical disc becomes maximum on an inner circumference side and an outer circumference side, and for detecting the eccentricity amount of the optical disc; and
   a slider movement processing unit for performing the track pull-in at the rotation angle, at which the degree of displacement of the track due to the eccentricity of the optical disc becomes maximum, detecting a displacement direction of the optical disc at the time of the pull-in, and moving the slider in the detected displacement direction for a distance equal to or almost equal to the eccentricity amount of the optical disc.

2. The optical disc device according to claim 1, wherein the disc rotation angle obtaining processing unit irradiates the optical disc with a laser beam while keeping the tracking servo off; and detects a rotation angle of the optical disc at which the laser beam on the optical disc crossing the track of the optical disc changes, as the rotation angle at which the degree of displacement of the track due to the eccentricity of the optical disc becomes maximum on the inner circumference side and the outer circumference side.

3. The optical disc device according to claim 1, wherein as a result of obtaining the rotation angle at which the degree of displacement of the track due to the eccentricity of the optical disc becomes maximum on the inner circumference side and the outer circumference side, the disc rotation angle obtaining processing unit creates a first map storing a track displacement direction for each specified rotation angle of the optical disc; and
   wherein the slider movement processing unit detects the track displacement direction of the optical disc at the time of the track pull-in based on the rotation angle of the optical disc at the time of the track pull-in and on the first map, and moves the slider in the detected displacement direction for a distance equal to or almost equal to the eccentricity amount of the optical disc.

4. The optical disc device according to claim 1, wherein after the track displacement direction due to the eccentricity of the optical disc is switched, the slider movement processing unit detects a current track displacement direction of the optical disc after the optical disc has rotated by a specified rotation angle.

5. The optical disc device according to claim 1, wherein when the eccentricity amount of the optical disc exceeds a predetermined threshold value, the slider movement processing unit performs the track pull-in and detects the track displacement direction of the optical disc at the time of the track pull-in, and moves the slider in the detected displacement direction for a distance equal to or almost equal to the eccentricity amount of the optical disc.

6. A tracking and slider control method for turning tracking servo on at specified timing to perform track pull-in, performing tracking after the track pull-in by moving an object lens in a radial direction with respect to an optical disc, and moving a slider in a radial direction with respect to the optical disc based on moving of the objective lens, the tracking and slider control method comprising:
   a first step of obtaining a rotation angle at which a degree of displacement of the track due to eccentricity of the optical disc becomes maximum on an inner circumference side and an outer circumference side, and detecting the eccentricity amount of the optical disc; and
   a second step of performing the track pull-in at the rotation angle, at which the degree of displacement of the track due to the eccentricity of the optical disc becomes maximum, detecting a track displacement direction of the optical disc at the time of the pull-in, and moving the slider in the detected displacement direction for a distance equal to or almost equal to the eccentricity amount of the optical disc.

7. The tracking and slider control method according to claim 6, wherein in the first step, the optical disc is irradiated with a laser beam while keeping the tracking servo off; and a rotation angle of the optical disc at which the laser beam on the optical disc crossing the track of the optical disc changes, is detected as the rotation angle at which the degree of displacement of the track due to the eccentricity of the optical disc becomes maximum on the inner circumference side and the outer circumference side.

8. The tracking and slider control method according to claim 6, wherein in the first step, a first map storing a track displacement direction for each specified rotation angle of the optical disc is created as a result of obtaining the rotation angle at which the degree of displacement of the track due to the eccentricity of the optical disc becomes maximum; and wherein in the second step, the current track displacement direction of the optical disc is detected based on the current rotation angle of the optical disc and on the first map, and the slider is moved in the detected displacement direction for a distance equal to or almost equal to the eccentricity amount of the optical disc.

9. The tracking and slider control method according to claim 6, wherein in the second step, after the track displacement direction due to the eccentricity of the optical disc is switched, the current track displacement direction of the optical disc is detected after the optical disc has rotated by a specified rotation angle.

10. The tracking and slider control method according to claim 6, wherein in the second step, when the eccentricity amount of the optical disc exceeds a predetermined threshold value, the track pull-in is performed and the current track displacement direction of the optical disc is detected, and the slider is moved in the detected displacement direction for a distance equal to or almost equal to the eccentricity amount of the optical disc.

* * * * *

UNITED STATES PATENT AND TRADEMARK OFFICE
CERTIFICATE OF CORRECTION

| | | |
|---|---|---|
| PATENT NO. | : 8,023,377 B2 | Page 1 of 1 |
| APPLICATION NO. | : 12/156318 | |
| DATED | : September 20, 2011 | |
| INVENTOR(S) | : Aihara et al. | |

It is certified that error appears in the above-identified patent and that said Letters Patent is hereby corrected as shown below:

Cover Page:

item (73) Assignee,

"Hitachi-LG Data Storage, Inc., Tokyo (JP)"

should read,

-- Hitachi-LG Data Storage, Inc., Tokyo, (JP);
Hitachi, Ltd., Tokyo (JP) --

Signed and Sealed this
Fourth Day of September, 2012

David J. Kappos
*Director of the United States Patent and Trademark Office*